United States Patent [19]

Fromme et al.

[11] 3,855,941
[45] Dec. 24, 1974

[54] MONO-RAIL TROLLEY
[75] Inventors: Hans-Georg Fromme, Wetzlar; Erich Lehberger, Dornholzhausen, both of Germany
[73] Assignee: R. Stahl Aufzuge GmbH, Neuhausen auf den Fildern, Germany
[22] Filed: July 25, 1973
[21] Appl. No.: 382,471

[30] Foreign Application Priority Data
July 25, 1972 Germany............................ 2236509
June 22, 1973 Germany............................ 2331656

[52] U.S. Cl................... 105/150, 104/93, 191/45 R
[51] Int. Cl............................................. E04h 3/04
[58] Field of Search ............. 191/22, 23, 29, 33, 45, 191/50; 104/89, 93, 118; 105/141, 146, 150, 156

[56] References Cited
UNITED STATES PATENTS
3,345,471 10/1967 Kilburg .............................. 191/45 R
3,392,244 7/1968 Hillmann........................... 191/45 R
3,696,890 10/1972 Armstrong........................... 104/93

Primary Examiner—M. Henson Wood, Jr.
Assistant Examiner—Richard A. Bertsch
Attorney, Agent, or Firm—Krafft & Wells

[57] ABSTRACT

A mono-rail trolley having a carrying wheel adapted to run along the inside of a substantially C-shaped guide rail comprises mainly a shackle to which the trolley motor and the carrying wheel are mounted. The carrying wheel moves on the inside of the rail behind the lower rim which guide wheels which are also mounted on the shackle, move on the inside of the rail behind an upper rim. In order to facilitate both dismantling of the trolley and its removal from the guide rail the guide wheels are mounted on a carrier plate which in turn is detachably connected to the upper shackle portion. The trolley may thus be easily taken out of the guide rail simply by separating the carrier plate from the shackle. All electrical connections are plug-in connections which may also be disconnected in a simple manner.

8 Claims, 6 Drawing Figures 3,855,941

MONO-RAIL TROLLEY

BACKGROUND OF THE INVENTION

The present invention relates to mono-rail trolleys. More particularly the invention pertains to such mono-rail trolleys which comprise current conduction bars in the upper portion of the guide rail, and which further comprise a shackle to which the trolley motor, a carrying wheel and guide wheels are mounted.

Mono-rail trolleys of the above type usually run in guide rails having an almost closed cross section and being provided on one side with a slot in longitudinal direction. The form of the cross section may also be described as C-shaped with small rims extending on the front side in an upward and downward direction, respectively.

It will be readily comprehended that these rims represent an obstacle for the removal of the trolley from the guide rail in a direction transverse to the direction of the trolley run. If, therefore, defects occur with the trolley, especially with the motor and/or the carrying wheel, which render the trolley immovable and which cannot be repaired while the trolley remains in the guide rail known trolleys must be completely dismantled and the electric wires must be disconnected in order to remove the trolley from the rail. This, of course, stops the operation of the trolley and the conveyance of goods for a longer period of time.

It is therefore an object of the invention to provide a trolley having an improved travelling mechanism, which is simple to repair and thus interrupts the operation of the trolley only for a short time.

SUMMARY OF THE INVENTION

The above stated objects are attained by providing a trolley, comprising a shackle, a trolley motor, a carrying wheel and guide wheels mounted thereto, with a head portion on the shackle and a carrier plate whereon the guide wheels are mounted in detachable connection with the head portion. At least part of the electric components are also mounted on the carrier plate and the connection between these components and further electrical parts of the trolley is established by means of plug-in connections.

In case the motor shaft and the shaft of the carrying wheel are in a direct driving connection the carrier plate is also provided with a wiper contact for the current supply and with the control elements for the trolley movement. As already pointed out, the connection to the further electric components may be established by plug-in connections. If desired cables may be used in these connections also.

A transverse girder may also be mounted to the lower portion of the shackle for carrying the objects to be transported. Such girder may be provided with a trigger lever for stopping the trolley in the mono-rail if an undue accumulation of goods should occur. This trigger lever may be connected to the control means by a Bowden cable. However, the electric switch for stopping the trolley may also be mounted directly on the girder. In this case the switch will be connected to the wiper on the carrier plate by means of a cable and a plug.

In an embodiment comprising a belt connection between the trolley motor and the carrying wheel the motor may be mounted on the carrier plate and may thus be made separately detachable from the shackle and the carrying wheel together with the other electric components.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
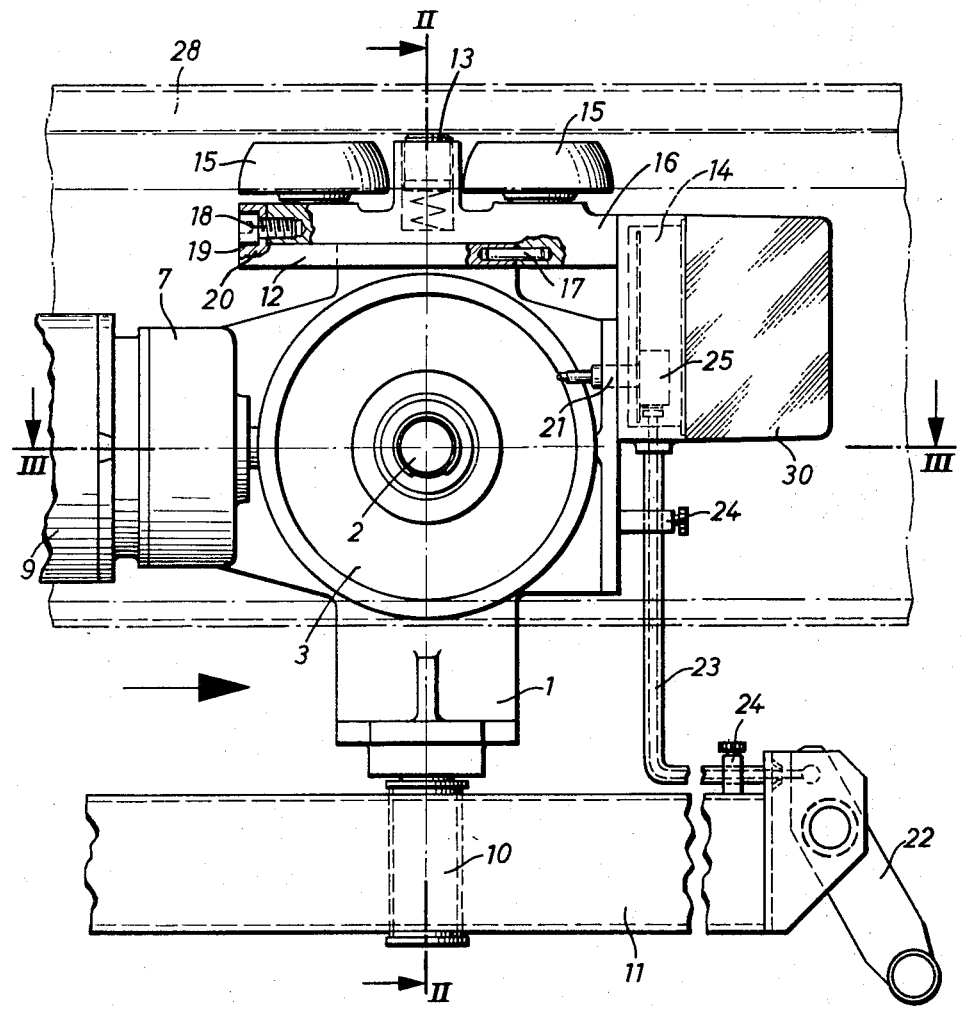
FIG. 1 shows the travelling mechanism of a trolley in a guide rail, viewed in the direction perpendicular to the direction of the trolley run.
Figure 2:
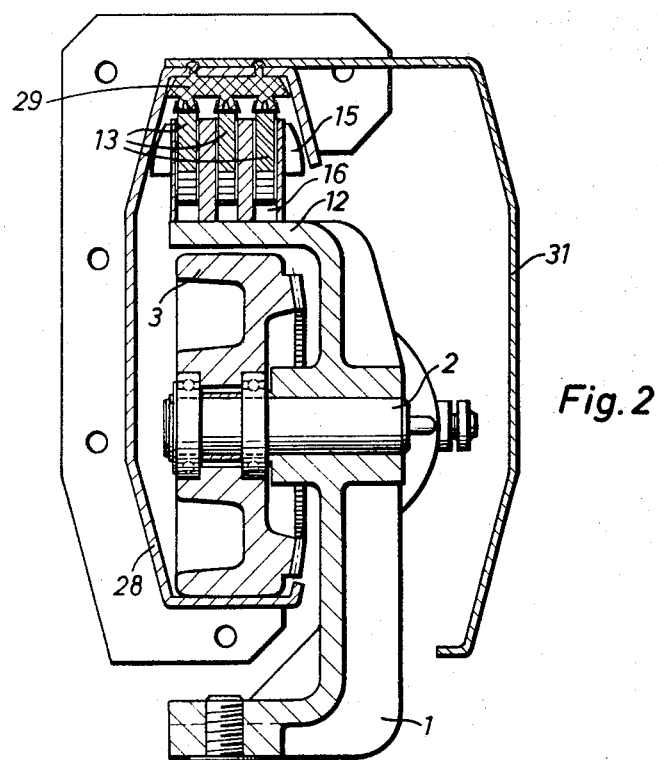
FIG. 2 is a sectional view cut along line II—II in FIG. 1.
Figure 3:
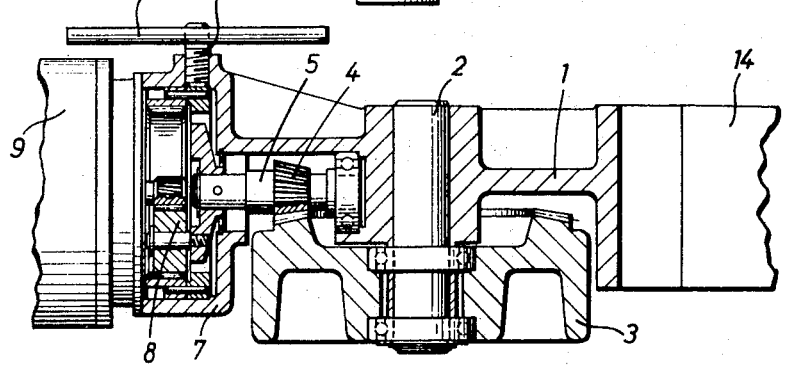
FIG. 3 is a sectional view of the trolley in the plane of the shafts, cut along line III—III in FIG. 1.

Referring now to the drawings, in FIG. 1 the shackle 1 is provided with a rigid axis 2 whereon a carrying wheel 3 is journaled. The wheel 3 is provided with bevel teeth 4 and is in mesh with a correspondingly toothed pinion 5. The latter is driven by a motor 9 through a planetary gear 8 housed in a suitable housing 7. A number of elements of the gear as well as the carrying wheel may be made of plastic in order to achieve a smooth run and to reduce production costs.

The lower portion of the shackle 1 is provided with a belt 10 on which a transverse girder 11 is hinged. The girder serves as the carrying element for the goods to be transported either alone or in combination with other known carrier means.

On the upper portion 12 of the shackle 1 there is mounted a carrier plate 16 which comprises current conducting means such as the wipers 13 and a switch and control box 14. Further, two guide wheels 15, which rotate in a horizontal plane are also mounted on carrier plate 16.

The mechanical connection between the upper portion 12 and the carrier plate 16 is brought about by a pin 17 which is received in a hole of plate 16 and by a locking bolt 18 on the plate 16. The locking bolt fits into a hole 19 in an angle piece 20 of the upper portion 12 and may be locked therein by a turning movement.

The electric connection between the switch box 14 and the motor 9 is established by a plug-in connection 21.

On the transverse girder 11 there is a trigger lever pivotably mounted which is connected to the stop switch 25 in the switch box 14 by a Bowden cable 23. The Bowden cable is fixed to the girder by detachable attachment screws 24.

The sun wheel of the planet gear 8 is secured in the gear box 7 by a screw 26. The screw 26 is rigidly connected to a lever 27. In case of a defect the driving connection between the motor 9 and the carrying wheel may be interrupted by pulling down the lever 27.

After unlocking the locking bolt 18, removing the plug-in connection 21 and detaching the Bowden cable 23 from the trigger lever 22 the plate 16 together with the current conducting elements may be separated from the shackle 1 with carrying wheel 3, motor 9 and girder 11 so that the whole trolley may be taken out of the rail 28.

In its upper u-bend the guide rail 28 comprises the conductor bars 29.

The switch box 14 is covered by a clear vision cap 30. The guide rail 28 may be provided with a guard plate 31 for covering up the travelling mechanism.

Figure 4:
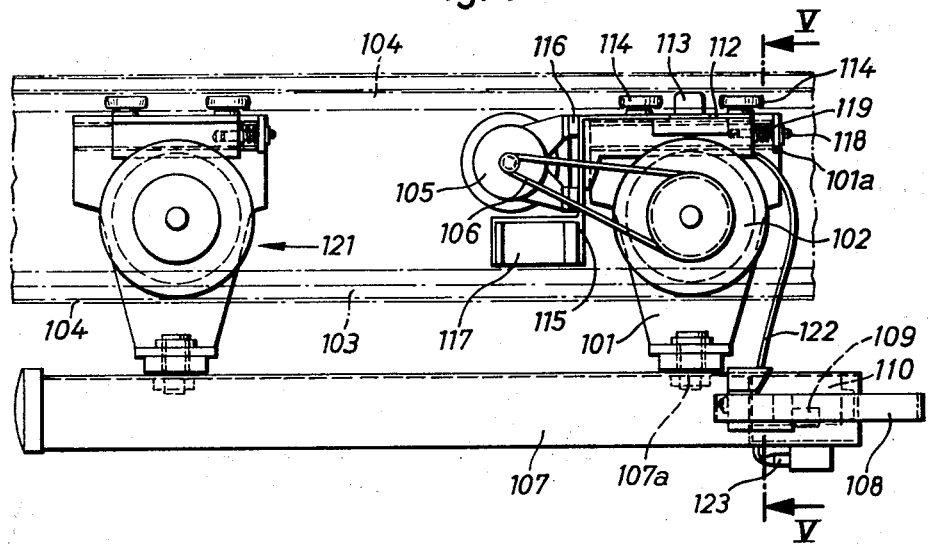
FIG. 4 is an elevational view of the trolley of a second embodiment of the invention.
Figure 5:
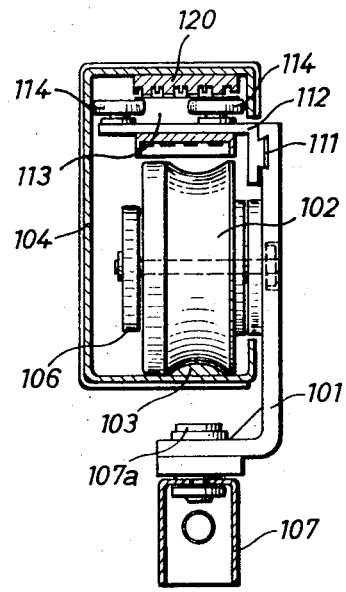
FIG. 5 is a sectional view, cut along line V—V of FIG. 4.
Figure 6:
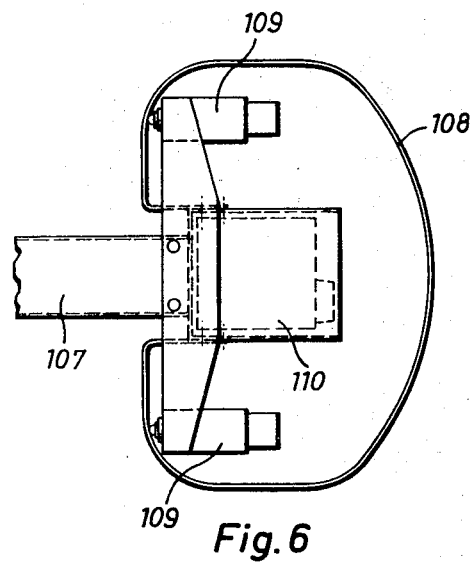
FIG. 6 shows the upper portion of the transverse girder together with the stopping device.

In the second embodiment shown in FIGS. 4; 5 and 6 a carrying wheel 102 is mounted on a shackle 101. The carrying wheel has a concave running surface which moves on the convex running surface 104 of a guide rail 103 having a substantially C-shaped cross section. The carrying wheel is driven by a motor 105 through a belt 106.

On the lower portion of the shackle 101 there is a transverse girder 107 pivotably hinged on a bolt 107a. The girder is provided with a resilient bow 108 on its front end in the direction of the trolley run. The bow operates the stop switches 109 for stopping the run of the trolley. A time delay device 110 is arranged between the stop switches. The electric connection between these elements is established by a cable 122 with a plug-in connection 123. These elements which are arranged at the front end of the girder in the direction of the travel of the trolley and serve to stop the trolley in case of undue accumulation of transported goods.

At its upper portion the shackle 101 supports a carrier plate 112 by means of a dovetail connection. The carrier plate comprises a carbon holder 113, guide wheels 114 and an angle piece 115 extending perpendicularly in downward direction where it forms a support 116. The motor 105 is arranged on this support and a switch box 117 is fixed to the lower surface thereof.

At the front surface of the carrier plate 112 there is located a bolt 118 which extends into a suitably arranged hole 101a in the shackle 101 with a tension spring 119 inserted between the plate and the shackle.

The above described elements which are mainly supported by the shackle 101 represent the travelling mechanism of the trolley. The girder 107 is in addition supported by a group of wheels 121 having about the same mechanical design as the motor-driven travelling mechanism.

In the upper bend of the guide rail there are disposed the current conducting bars 120.

For connecting the current conducting elements with the mechanical elements supported by the shackle 101 the carrier plate 112 is pushed into the dovetail 111. The tension spring 119 is pressed together and the belt 106 is placed on the pulley of the motor 105 and on the carrying wheel 102. The tension spring 119 then brings about the belt tension. Finally, the cable 122 must be plugged in.

Should it be necessary to perform repair work on the electric elements of the travelling mechanism these elements may easily be separated from the shackle 101 after the belt 106 has been taken off and the cable 122 has been disconnected.

What is claimed is:

1. A trolley for a substantially C-shaped mono-rail having current conducting bars in the upper portion of the rail, the trolley comprising
   a. a motor,
   b. a gear mechanism in driving connection with said motor,
   c. a carrying wheel adapted to support the trolley on the running surface of the mono-rail, said carrying wheel being driven by said gear mechanism,
   d. a shackle to which said motor, said gear mechanism and said carrying wheel are mounted for forming a subassembly which may be separately handled,
   e. a carrier plate detachably mounted on the upper portion of said shackle, and
   f. current conducting means for transmitting the current from the current conducting bars by way of plug-in connections to the motor and to further electric components, said current conducting means and said plug-in connections being part of said carrier plate;

the trolley being safely retained in said mono-rail when said carrier plate is mounted on said upper shackle portion and being easily removable from said mono-rail when said carrier plate is detached from said upper shackle portion and said plug-in connections are disconnected so that said shackle and said carrier plate may be handled as separate units.

2. A trolley for a substantially C-shaped mono-rail as claimed in claim 1, and further comprising guide wheels mounted for rotation in a horizontal axis on said carrier plate, said guide wheels being adapted to contact the inner surface in the upper portion of the mono-rail, thereby providing a guidance for the trolley in a vertical plane.

3. A trolley for a substantially C-shaped mono-rail as claimed in claim 1, and further comprising a box for switches and electric control elements attached to said carrier plate.

4. A trolley for a substantially C-shaped mono-rail as claimed in claim 1, and further comprising a girder hinged on said shackle for transporting goods by the trolley; a trigger lever being pivotably attached to said girder and being connected by a Bowden cable to a stop switch in the motor circuit; said trigger lever being adapted to contact other goods in the path of the trolley and to switch off said motor if an undue accumulation of goods should occur in said trolley path.

5. A trolley for a substantially C-shaped mono-rail having the current conducting bars in the upper portion of the rail, the trolley comprising
   a. a motor,
   b. a carrying wheel adapted to support the trolley on the running surface of the mono-rail, said carrying wheel being driven by said motor through a belt,
   c. a girder for supporting the goods to be transported,
   d. a shackle to which said carrying wheel and said girder are mounted for forming a subassembly which may be separately handled,
   e. a carrier plate detachably mounted on the upper portion of said shackle, and
   f. current conducting means for transmitting the current from the current conducting bars by way of plug-in connections to the motor and to further electric components, said motor, said current conducting means and said plug-in connections being part of said carrier plate;

the trolley being safely retained in said mono-rail when said carrier plate is mounted on said upper shackle portion and being easily removable from said mono-rail when said carrier plate is detached from said upper shackle portion and said plug-in connections are disconnected so that said shackle and said carrier plate may be handled as separate units.

6. A trolley for a substantially C-shaped mono-rail as claimed in claim 5, wherein the detachable connection between said upper shackle portion and said carrier plate is a dovetail-connection.

7. A trolley for a substantially C-shaped mono-rail as claimed in claim 5, and further comprising a tension spring inserted between said upper shackle portion and said carrier plate for establishing an appropriate belt tension.

8. A trolley for a substantially C-shaped mono-rail as claimed in claim 5, wherein electric components are attached to said girder and an electric connection is established between said components and said carrier plate by cables and plugs.

* * * * *